(12) United States Patent
Peng et al.

(10) Patent No.: US 10,720,855 B2
(45) Date of Patent: Jul. 21, 2020

(54) POWER SUPPLY AND RESIDUAL VOLTAGE DISCHARGING METHOD

(71) Applicant: DELTA ELECTRONICS, INC., Taoyuan (TW)

(72) Inventors: Te-Chih Peng, Taoyuan (TW); Wei-Chih Hung, Taoyuan (TW); Min-Cheng Chiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/801,312

(22) Filed: Nov. 1, 2017

(65) Prior Publication Data

US 2018/0301976 A1    Oct. 18, 2018

(30) Foreign Application Priority Data

Apr. 13, 2017    (CN) .......................... 2017 1 0240812

(51) Int. Cl.
*H02M 7/219*      (2006.01)
*H02M 1/32*       (2007.01)
*H02M 3/335*      (2006.01)
*H02M 1/00*       (2006.01)

(52) U.S. Cl.
CPC ............. *H02M 7/219* (2013.01); *H02M 1/32* (2013.01); *H02M 3/33592* (2013.01); *H02M 2001/0032* (2013.01); *H02M 2001/322* (2013.01)

(58) Field of Classification Search
CPC .. H02M 1/088; H02M 1/32; H02M 2001/322; H02M 3/33592; H02M 7/217; H02M 7/219; H02M 2001/0032
See application file for complete search history.

(56) References Cited

U.S. PATENT DOCUMENTS

| | | | | |
|---|---|---|---|---|
| 6,185,111 B1* | 2/2001 | Yoshida | ............ | H02M 3/33592 363/17 |
| 6,353,547 B1* | 3/2002 | Jang | .................. | H02M 3/33569 363/132 |
| 6,961,253 B1* | 11/2005 | Cohen | ..................... | H02M 1/08 363/89 |

(Continued)

FOREIGN PATENT DOCUMENTS

| | | |
|---|---|---|
| CN | 1447504 A | 10/2003 |
| CN | 101583232 A | 11/2009 |

(Continued)

*Primary Examiner* — Fred E Finch, III (74) *Attorney, Agent, or Firm* — CKC & Partners Co., LLC (57) ABSTRACT

A power supply includes a transformer winding, a switching circuit, a controller and a filter circuit. The transformer winding is configured to provide a first voltage. The switching circuit is coupled to the transformer winding and includes a first and a second switching unit. On the condition that the power supply is operated under a standby mode, the controller controls the first and the second switching units to provide a discharging path between two terminals of the transformer winding. On the condition that the power supply is operated under an operating mode, the controller controls the switching circuit such that the switching circuit provides a second voltage according to the first voltage. The filter circuit is coupled to the switching circuit and configured to filter the second voltage to provide an output voltage.

18 Claims, 8 Drawing Sheets

(56) References Cited

U.S. PATENT DOCUMENTS

| | | | | |
|---|---|---|---|---|
| 7,173,831 B1* | 2/2007 | Vogman | ............ | H02M 3/33592 363/131 |
| 2001/0054881 A1* | 12/2001 | Watanabe | ............. | H02J 7/0065 320/166 |
| 2002/0101741 A1* | 8/2002 | Brkovic | ................... | H02M 1/08 363/16 |
| 2002/0118554 A1* | 8/2002 | Watanabe | ............. | H02M 7/217 363/39 |
| 2002/0141206 A1* | 10/2002 | Brkovic | ................ | H02M 1/088 363/24 |
| 2003/0185021 A1* | 10/2003 | Huang | .............. | H02M 3/33592 363/17 |
| 2004/0257837 A1* | 12/2004 | Xu | .................... | H02M 3/33592 363/21.04 |
| 2005/0047175 A1* | 3/2005 | Kawasaki | ......... | H02M 3/33569 363/16 |
| 2010/0232180 A1* | 9/2010 | Sase | ................. | H02M 3/33576 363/17 |
| 2010/0277146 A1 | 11/2010 | Zhou et al. | | |
| 2013/0235632 A1* | 9/2013 | Knoedgen | ............... | H02M 7/06 363/126 |
| 2015/0015071 A1* | 1/2015 | Deboy | .................. | H02M 3/335 307/31 |
| 2015/0036390 A1* | 2/2015 | Ou | ..................... | H02M 3/33592 363/17 |
| 2016/0094137 A1* | 3/2016 | Jitaru | ................... | H02M 3/3353 363/21.03 |
| 2016/0329822 A1* | 11/2016 | Sanchez | ............ | H02M 3/33569 |
| 2017/0271993 A1* | 9/2017 | Jitaru | .................. | H02M 1/4225 |
| 2017/0358994 A1* | 12/2017 | Ueno | ..................... | H02M 1/10 |

FOREIGN PATENT DOCUMENTS

| | | |
|---|---|---|
| CN | 202309061 U | 7/2012 |
| CN | 102761237 A | 10/2012 |
| TW | 502486 B | 9/2002 |
| TW | 201126328 A1 | 8/2011 |

* cited by examiner

POWER SUPPLY AND RESIDUAL VOLTAGE DISCHARGING METHOD

RELATED APPLICATIONS

This application claims priority to China Application Serial Number 201710240812.7, filed Apr. 13, 2017, which is herein incorporated by reference.

BACKGROUND

Technical Field

The present disclosure relates to a power supply, and in particular, to the power supply with ability to eliminate residual voltage.

Description of Related Art

For existing power supplies, due to the parasitic effect of the energy-storage elements such as inductors and capacitors in the circuitry, the residual voltage may exist at output terminals of the power supplies during standby. On the condition that the residual voltage is too high, malfunction of latter load circuit may be resulted.

To prevent the system from abnormal operation due to high residual voltage, the residual voltage of the power supply during standby is required to be lower than a nominal rating. Therefore, an important area of research in the field involves ways in which to reduce the residual voltage of the power supply with low costs and a simplified circuit structure.

SUMMARY

One aspect of the present disclosure is a power supply. The power supply includes a transformer winding, a switching circuit, a controller and a filter circuit. The transformer winding is configured to provide a first voltage. The switching circuit is electrically coupled to the transformer winding and includes a first switching unit and a second switching unit. The controller is electrically coupled to the first switching unit and the second switching unit. On the condition that the power supply is operated under a standby mode, the controller controls the first switching unit and the second switching unit to provide a discharging path between two terminals of the transformer winding. On the condition that the power supply is operated under an operating mode, the controller controls the switching circuit such that the switching circuit provides a second voltage according to the first voltage. The filter circuit is electrically coupled to the switching circuit and configured to filter the second voltage to provide an output voltage.

Another aspect of the present disclosure is a residual voltage discharging method. The residual voltage discharging method includes controlling a power supply to be operated under a standby mode; on the condition that the power supply is operated under the standby mode, controlling, by a controller in the power supply, a first switching unit and a second switching unit to provide a discharging path between two terminals of a transformer winding in the power supply, wherein the first switching unit and the second switching unit are configured to be on or off selectively on the condition that the power supply is operated under an operating mode to provide an output voltage; and discharging via the discharging path to eliminate residual voltage of the transformer winding until the output voltage is lower than a target level.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
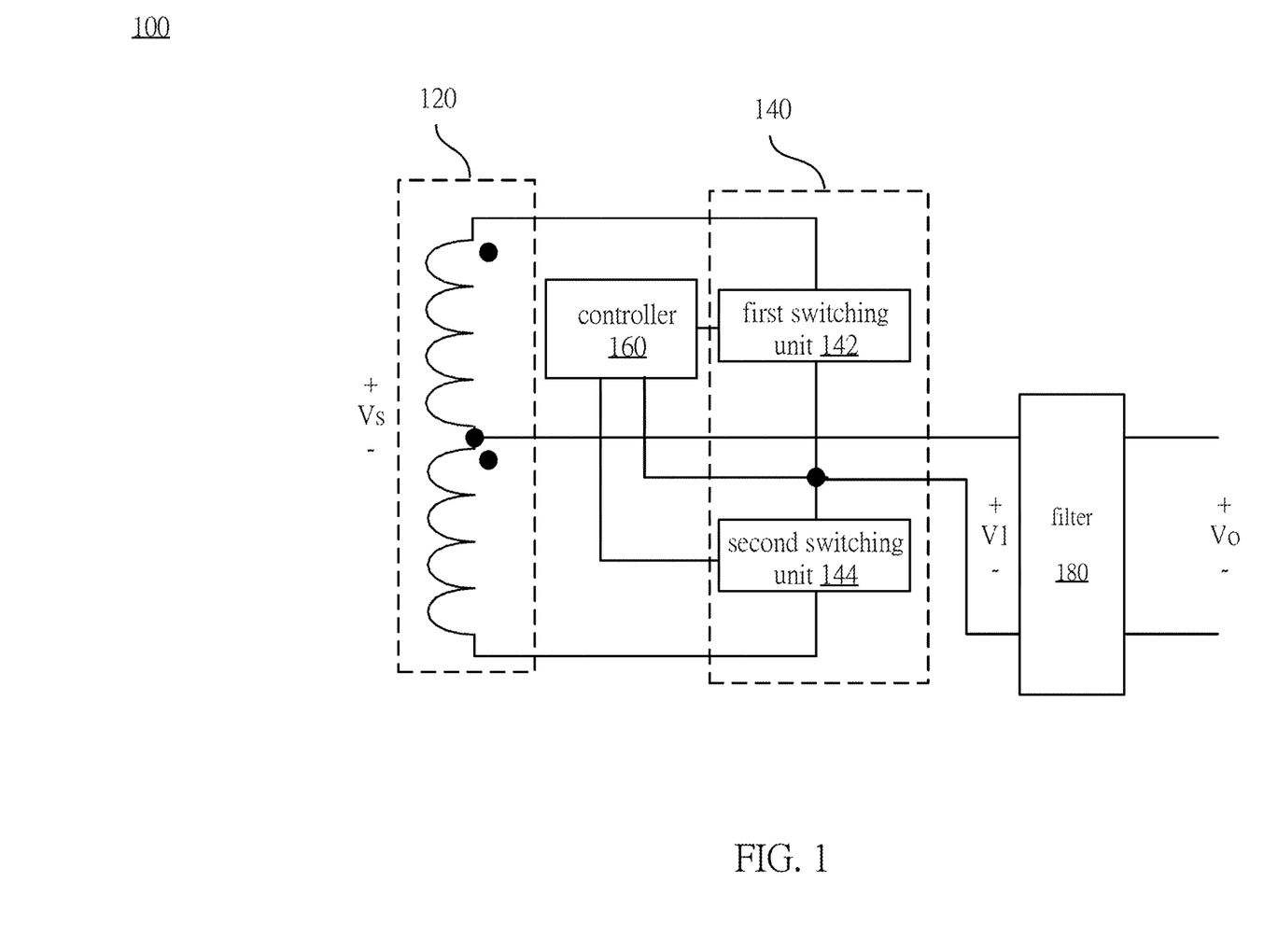
FIG. 1 is a diagram illustrating a power supply according to some embodiments of the present disclosure.

Reference is made to FIG. 1. FIG. 1 is a diagram illustrating a power supply 100 according to some embodiments of the present disclosure. As shown in FIG. 1, in some embodiments, a secondary side of the power supply 100 includes a transformer winding 120, a switching circuit 140, a controller 160 and a filter circuit 180. Specifically, a primary side of the power supply 100 may choose a half-bridge circuit structure, a push-pull circuit structure, a full-bridge circuit structure, etc. to achieve various isolated high frequency DC power converter circuits based on actual needs.

The transformer winding 120 may be the secondary winding at the secondary side of the power supply 100 and is configured to provide the voltage Vs in response to the changes of the primary voltage of the primary winding. As shown in the figure, in some embodiments, the transformer winding 120 may be a center tapped winding including a first terminal, a second terminal, and a center tap terminal.

The switching circuit 140 includes a switching unit 142 and a switching unit 144. For example, the switching units 142 and 144 may be achieved by various semiconductor elements such as a metal oxide semiconductor field effect transistor (MOSFET), a bipolar junction transistor (BJT), etc., but the present disclosure is not limited thereto. The switching circuit 140 is electrically coupled to the transformer winding 120. Specifically, in the embodiment shown in FIG. 1, the switching unit 142 is electrically coupled between a first terminal (e.g., a dotted terminal) of the transformer winding 120 and a first input terminal (e.g., a negative input terminal) of the filter circuit 180. The switching unit 144 is electrically coupled between a second terminal (e.g., an undotted terminal) of the transformer winding 120 and the first input terminal of the filter circuit 180. A center tap terminal of the transformer winding 120 is electrically coupled to a second input terminal (e.g., a positive input terminal) of the filter circuit 180.

The controller 160 is electrically coupled to the switching unit 142 and the switching unit 144 in the switching circuit 140. The controller 160 is configured to selectively control the switching unit 142 and the switching unit 144 to be on or off, in order to achieve the operation of the power supply 100 in accompanied with other circuit units.

On the condition that the power supply 100 is operated under an operating mode, the controller 160 is configured to control the switching circuit 140 such that the switching circuit 140 provides a voltage V1 to the filter circuit 180 according to the voltage Vs.

For example, on the condition that the secondary voltage Vs is positive, the dotted terminal of the transformation winding 120 is at a positive level, the switching unit 144 is on and the current flows through the switching unit 144 to the filter circuit 180. On the other hand, on the condition that the secondary voltage Vs is shifted to a negative level in response to the change of the primary voltage, the undotted terminal of the transformer winding 120 is at a positive level, the switching unit 142 is on and the current flows through the switching unit 142 to the filter circuit 180.

Alternatively stated, on the condition that the power supply 100 is operated under the operating mode, the controller 160 is configured to control the switching unit 142 and the switching unit 144 to be on respectively in a first period and a second period of a complete switching cycle, such that the switching circuit 140 performs rectification to the secondary voltage Vs provided by the transformer winding 120 and outputs the rectified voltage V1 to the filter circuit 180.

The filter circuit 180 is electrically coupled to the switching circuit 140, and configured to filter the voltage V1 outputted by the switching circuit 140 in order to provide the output voltage Vo. In some embodiments, the filter circuit 180 may be achieved by capacitance units and inductance units, and the detailed circuit will be further discussed in the following paragraphs.

Thus, by the cooperation of the transformer winding 120, the switching circuit 140, the controller 160 and the filter circuit 180, the secondary circuit of the power supply may perform rectification and filtering under the operating mode, and provide the dc output voltage Vo with proper voltage level to the output load terminal in accompanied with the switching operation of the switching elements in the primary circuit.

In some embodiments, on the condition that the power supply 100 is not required to provide voltage Vo to the load, the power supply 100 may switch from the operating mode to the standby mode to reduce unnecessary loss. However, under the standby mode, due to the parasitic effect of the energy-storage elements such as inductance units and capacitance units in the circuitry, the residual voltage may exist at the output terminal of the power supply 100. If the residual voltage is too high, the later stage system may be unable to operate normally. Therefore, under the standby mode, the residual output voltage Vo of the power supply 100 is required to be lower than a rated specification.

In order to reduce the residual output voltage Vo, in some embodiments, on the condition that the power supply 100 is operated under the standby mode, the controller 160 is configured to control the switching unit 142 and the switching unit 144 to provide a discharging path between two terminals of the transformer winding 120. Thus, the residual voltage resulted from the parasitic capacitance and parasitic inductance of the transformer winding 120 may be eliminated by the discharging path.

For example, the controller 160 may control the switching unit 142 and the switching unit 144 to be on at the same time. Thus, the first terminal and the second terminal of the transformer winding 120 may be electrically coupled to each other via the switching unit 142 and the switching unit 144. Accordingly, the energy stored in the parasitic capacitance and parasitic inductance in the transformer winding 120 will not be transmitted to the output terminal of the power supply 100. Therefore, the output voltage Vo may be lower than the rated specification.

Figure 2:
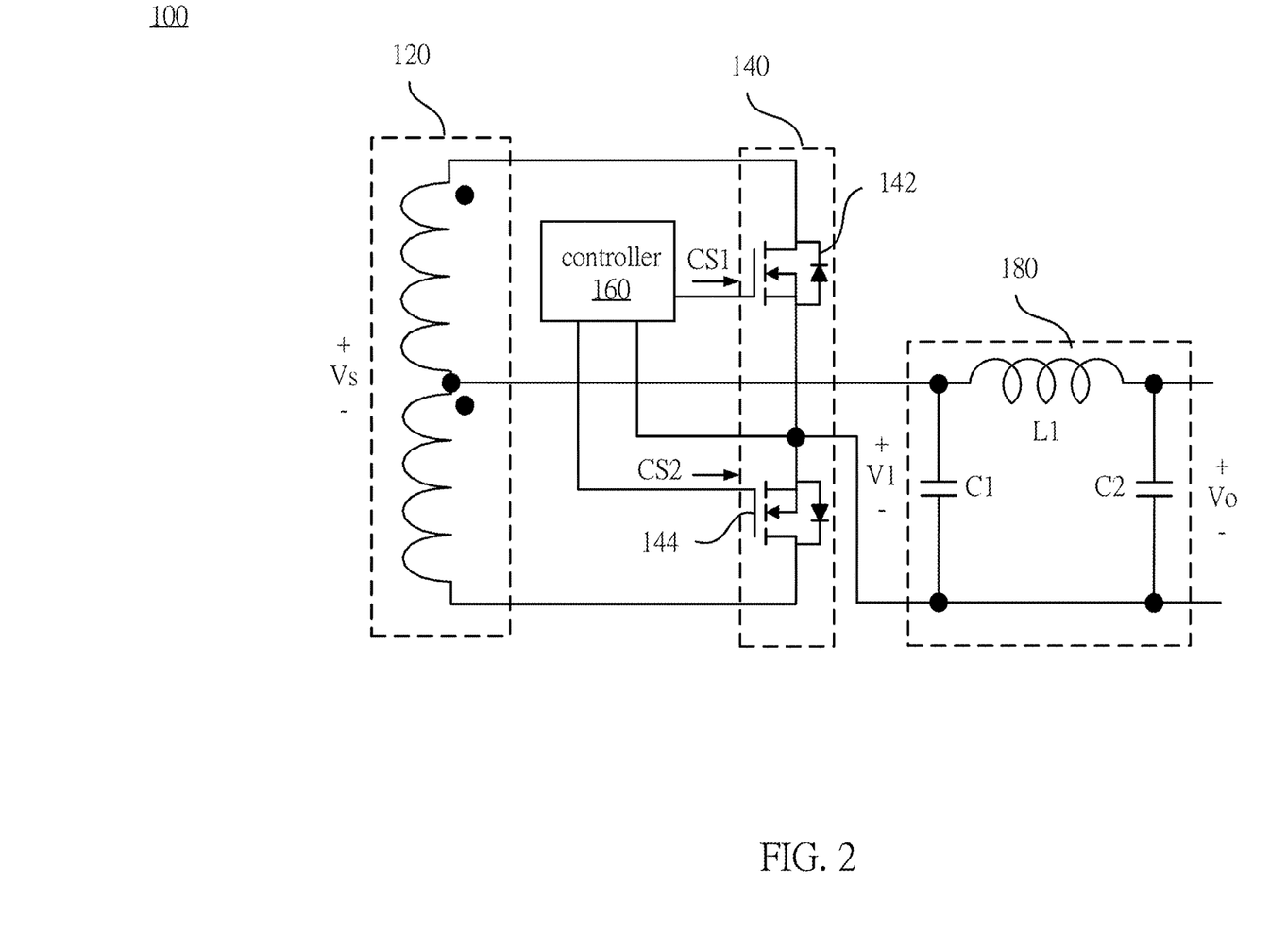
FIG. 2 is a diagram illustrated the power supply according to some embodiments of the present disclosure.

Reference is made to FIG. 2. FIG. 2 is a diagram illustrated the power supply 100 according to some embodiments of the present disclosure. As shown in FIG. 2, in some embodiments, the switching unit 142 and the switching unit 144 may each includes a transistor switch and a parasitic body diode respectively. The body diodes in the switching unit 142 and the switching unit 144 are reversely coupled to each other.

For example, the switching unit 142 and the switching unit 144 may be N-type metal-oxide-semiconductor field-effect-transistors (N type MOSFETs). The anode terminal of the body diode is the source terminal of the transistor, and the cathode terminal of the body diode is the drain terminal of the transistor. In some other embodiments, independent diode units may also be arranged across the source terminals and the drain terminals of the transistors in the switching unit 142 and the switching unit 144 in order to provide a current path for inverse current.

In the embodiment shown in FIG. 2, the controller 160 is configured to respectively output control signals CS1, CS2 to the gate terminals of the transistors in the switching unit 142 and the switching unit 144, so as to control the on and off of the transistor switches. For example, on the condition that the control signal CS1 is at an enable level (e.g., a high level), the switching unit 142 is turned on. On the condition that the control signal CS2 is at a disable level (e.g., a low level), the switching unit 142 is turned off. The operation of the control signal CS2 controlling the switching unit 144 is similar to the operation of the control signal CS1 controlling the switching unit 142, and thus further explanation are omitted herein for the sake of brevity.

As shown in FIG. 2, in some embodiments, the filter circuit 180 includes capacitance units C1, C2 and an inductance unit L1. A first terminal of the capacitance unit C1 is electrically coupled to a first input terminal of the filter circuit 180, and a second terminal of the capacitance unit C1 is electrically coupled to a second input terminal of the filter circuit 180. A first terminal of the inductance unit L1 is electrically coupled to the first terminal of capacitance unit C1, and a second terminal of the inductance unit L1 is electrically coupled to a first terminal of the capacitance unit C2. The first terminal of the capacitance unit C2 is electrically coupled to a first output terminal of the filter circuit 180, and a second terminal of the capacitance unit C2 is electrically coupled to a second output terminal of the filter circuit 180.

Thus, the capacitance units C1, C2 and the inductance unit L1 may form a LC-π type filter circuit to filter the voltage V1 outputted by the switching circuit 140, and provide the output voltage Vo via two terminals of the output capacitance unit C2. It is noted that the filter circuit 180 shown in FIG. 2 is merely a possible embodiment of the present disclosure and not meant to limit the present disclosure. In other embodiments, filter circuit 180 may be achieved by various inductance filtering circuits, capacitance filtering circuits, or inductance-capacitance filtering circuits.

Figure 3:
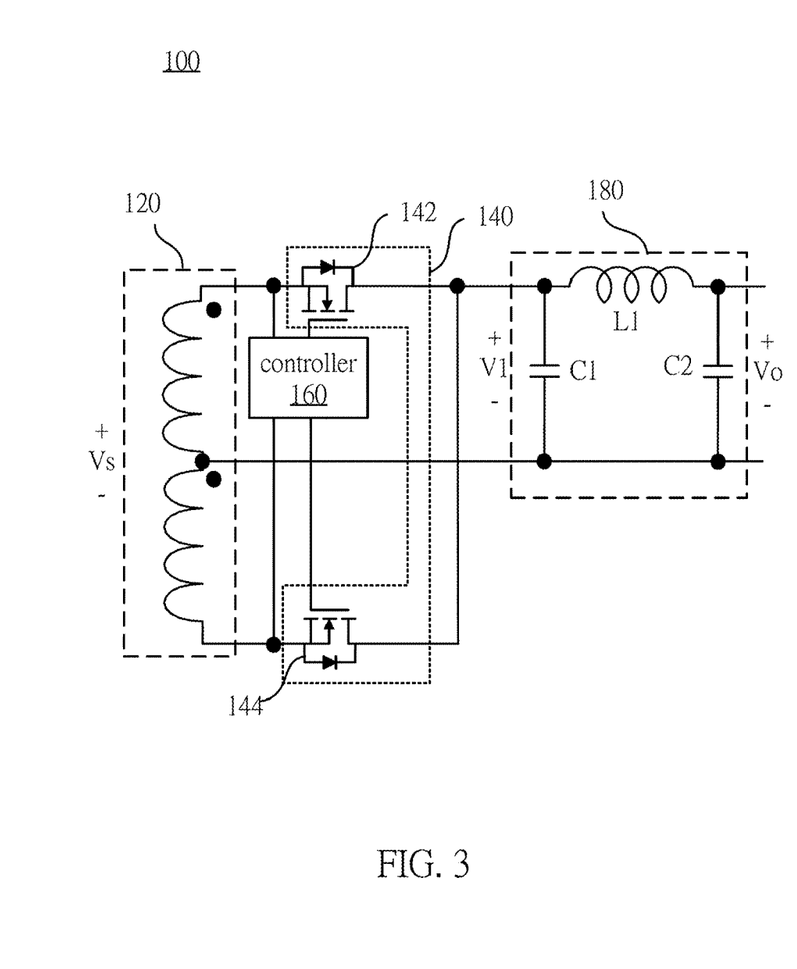
FIG. 3 is a diagram illustrating the power supply according to some other embodiments of the present disclosure.

Reference is made to FIG. 3. FIG. 3 is a diagram illustrating the power supply 100 according to some other embodiments of the present disclosure. Compared to the embodiments shown in FIG. 2, in the present embodiment, the switching unit 142 is electrically coupled between a first terminal (e.g., dotted terminal) of the transformer winding 120 and a positive input terminal of the filter circuit 180. The switching unit 144 is electrically coupled between a second terminal (e.g., undotted terminal) of the transformer winding 120 and the positive input terminal of the filter circuit 180. A center tap terminal of the transformer winding 120 is electrically coupled to a negative input terminal of the filter circuit 180. If the power supply 100 is operated under the operating mode, on the condition the secondary voltage Vs is positive, the dotted terminal of the transformer winding 120 is at a positive level, the switching unit 142 is turned on and the current flows through the switching unit 142 to the filter circuit 180. On the other hand, on the condition that the secondary voltage Vs is changed to negative in response to the change of the primary voltage, the undotted terminal of the transformer winding 120 is at a positive level, and the switching unit 144 is turned on and the current flows through the filter circuit 180. The remaining detailed operations are similar to the embodiment shown in FIG. 2, and thus further explanations are omitted herein for the sake of brevity.

Figure 4:
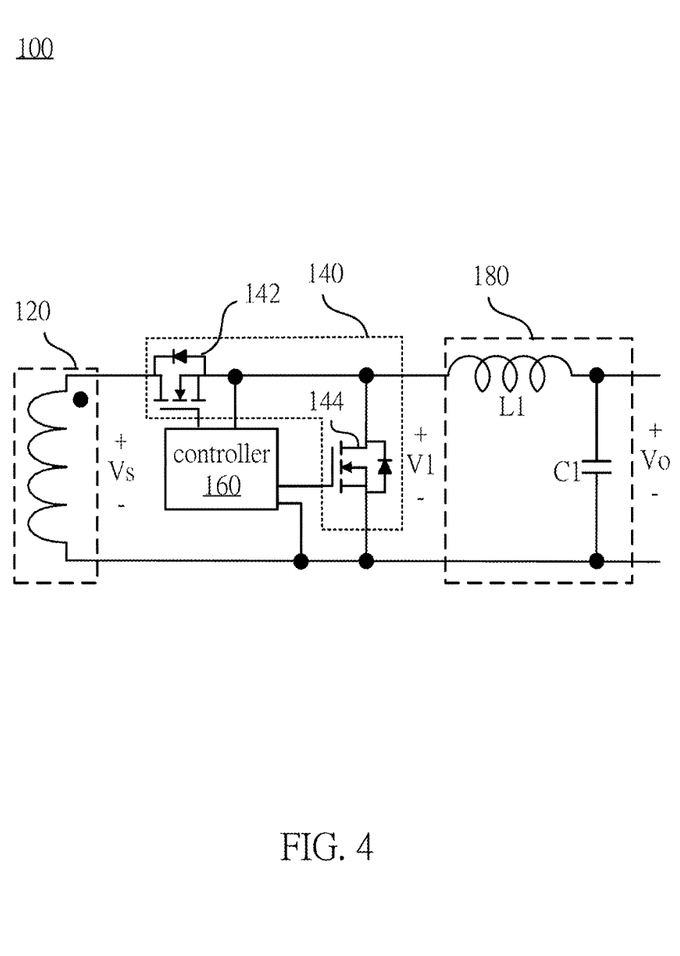
FIG. 4 is a diagram illustrating the power supply according to some other embodiments of the present disclosure.

Reference is made to FIG. 4. FIG. 4 is a diagram illustrating the power supply 100 according to some other embodiments of the present disclosure. In some embodiments, the power supply 100 may apply a forward convert circuit structure. The switching unit 142 in the switching circuit 140 at the secondary side is electrically coupled between the first terminal (e.g., dotted terminal) of the transformer winding 120 and the first input terminal (e.g., a positive terminal) of the filter circuit 180. The switching unit 144 is electrically coupled between the first input terminal of the filter circuit 180 and the second input terminal of the filter circuit 180. The second terminal (e.g., undotted terminal) of the transformer winding 120 is electrically coupled to the second input terminal of the filter circuit 180.

If the power supply 100 is operated under the operating mode, on the condition the secondary voltage Vs is positive, the controller 160 is configured to control the switching unit 142 to be on and the switching unit 144 to be off, such that the power is outputted from the transformer winding 120 via the switching unit 142 and the inductance unit L1 in the filter circuit 180 to the output terminal as the output voltage Vo. On the other hand, on the condition that the polarity of the secondary voltage Vs is reversed, the controller 160 is configured to control the switching unit 142 to be off and the switching unit 144 to be on, such that the inductance unit L1, the capacitance unit C1 and the switching unit 144 form a loop and the energy stored in the inductance unit L1 and the capacitance unit C1 may be provided to the load as the output voltage Vo.

Alternatively stated, in the present embodiment, the inductance unit L1 and the capacitance unit C1 in the filter circuit 180 not only perform as a low-pass filtering circuit but also perform as energy-storage elements.

Similar as stated in the above-mentioned embodiments, in order to reduce the residual output voltage Vo, the controller 160 may control the switching unit 142 and the switching unit 144 to be on at the same time. Thus, the first terminal and the second terminal of the transformer winding 120 may be electrically coupled to each other via the switching unit 142 and the switching unit 144. Accordingly, the energy stored in the parasitic capacitance and parasitic inductance in the transformer winding 120 will not be transmitted to the output terminal of the power supply 100. Therefore, the output voltage Vo may be lower than the rated specification.

As stated in the above paragraphs, in various embodiments, the switching circuit 140 may perform rectification by various types of circuits. Reference is made to FIG. 5 to FIG. 8. FIG. 5 to FIG. 8 are diagrams illustrating the power supply 100 according to some other embodiments of the present disclosure. In the embodiments shown in FIG. 5 to FIG. 8, the switching circuit 140 may be various full-bridge rectifying circuits or current double rectifying circuits.

Figure 5:
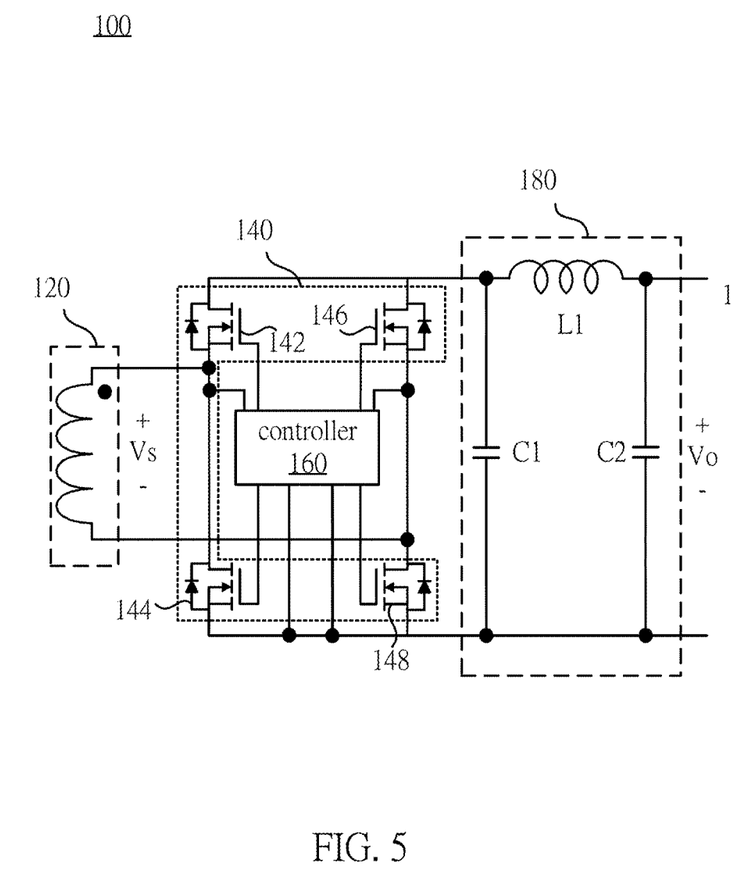
FIGS. 5-8 are diagrams illustrating the power supply according to some other embodiments of the present disclosure.

For example, as shown in the embodiment of FIG. 5, compared to the embodiment shown in FIG. 2, the switching circuit 140 further includes a switching unit 146 and a switching unit 148. The switching unit 142 is electrically coupled between the first terminal (e.g., dotted terminal) of the transformer winding 120 and the first input terminal of the filter circuit 180. The switching unit 144 is electrically coupled between the first terminal of the transformer winding 120 and the second input terminal of the filter circuit 180. The switching unit 146 is electrically coupled between the second terminal (e.g., undotted terminal) of the transformer winding 120 and the first input terminal of the filter circuit 180. The switching unit 148 is electrically coupled between the second terminal of the transformer winding 120 and the second input terminal of the filter circuit 180.

Accordingly, by the controller 160 correspondingly controlling the switching units 142-148, the switching circuit 140 may perform full-bridge rectification to the secondary voltage Vs.

Figure 6:
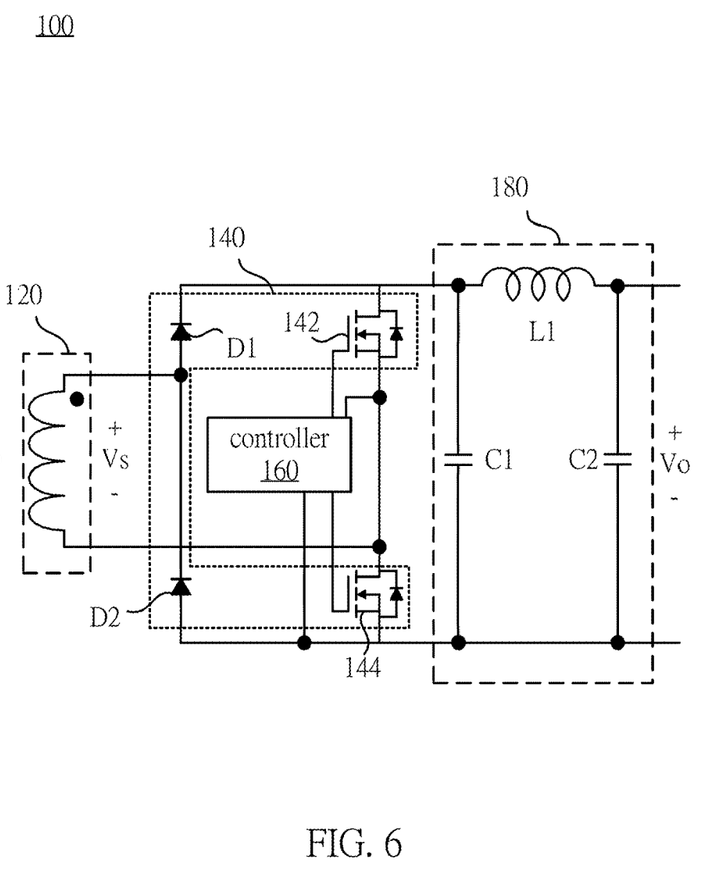

In the embodiment of FIG. 6, compared to the embodiment shown in FIG. 5, the semiconductor switches in one of the bridges of the full bridge circuit may be replaced by diodes D1, D2. Specifically, the diode D1 is electrically coupled between the first terminal (e.g., dotted terminal) of the transformer winding 120 and the first input terminal of the filter circuit 180. The diode D2 is electrically coupled between the first terminal of the transformer winding 120 and the second input terminal of the filter circuit 180. The switching unit 142 is electrically coupled between the second terminal (e.g., undotted terminal) of the transformer winding 120 and the first input terminal of the filter circuit 180. The switching unit 144 is electrically coupled between the second terminal of the transformer winding 120 and the second input terminal of the filter circuit 180.

Accordingly, by the controller 160 correspondingly controlling the switching units 142 and 144, the switching circuit 140 may perform full-bridge rectification to the secondary voltage Vs.

Figure 7:
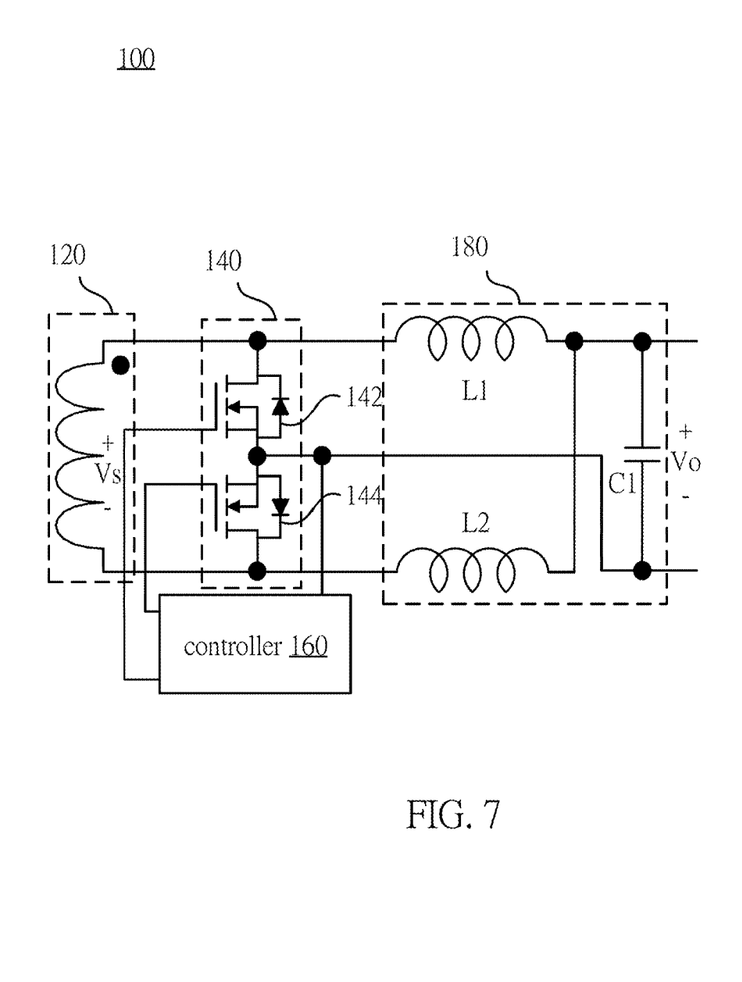

In the embodiment of FIG. 7, the first terminal of the switching unit 142 is electrically coupled to the first terminal (e.g., dotted terminal) of the transformer winding 120. The second terminal of the switching unit 142 is electrically coupled to the first terminal of the switching unit 144. The second terminal of the switching unit 144 is electrically coupled to the second terminal (e.g., undotted terminal) of the transformer winding 120. The first terminal of the transformer winding 120 is electrically coupled to the first input terminal of the filter circuit 180 and the second terminal of the transformer winding 120 is electrically coupled to the second input terminal of the filter circuit 180.

The filter circuit 180 includes inductance units L1, L2 and a capacitance unit C1. The inductance unit L1 is electrically coupled between the first input terminal of the filter circuit 180 and the first terminal of the capacitor C1. The inductance unit L2 is electrically coupled between the second input terminal of the filter circuit 180 and the first terminal of the capacitance unit C1. The second terminal of the capacitance unit C1 is electrically coupled to the second terminal of the switching unit 142 and the first terminal of the switching unit 144.

Accordingly, by the controller 160 correspondingly controlling the switching units 142 and 144, the switching circuit 140 may perform rectification to the secondary voltage Vs in accompanied with the filter circuit 180.

Figure 8:
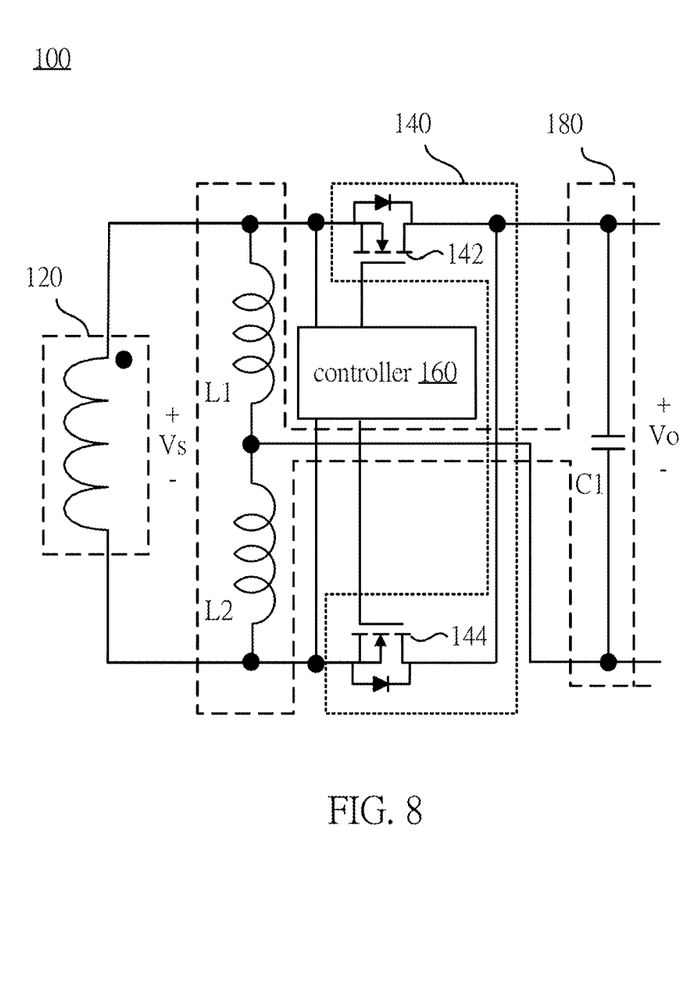

In the embodiment of FIG. 8, compared to the embodiment shown in FIG. 7, a first terminal of the inductance unit L1 is electrically coupled to the first terminal (e.g., dotted terminal) of the transformer winding 120. A second terminal of the inductance unit L1 is electrically coupled to a first terminal of the inductance unit L2. A second terminal of the inductance unit L2 is electrically coupled to the second terminal (e.g., undotted terminal) of the transformer winding 120.

The switching unit 142 is electrically coupled between the first terminal of the transformer winding 120 and a first terminal of the capacitance unit C1. The switching unit 144 is electrically coupled between the second terminal of the transformer winding 120 and the first terminal of the capacitance unit C1. The second terminal of the inductance unit L1 and the first terminal of the inductance unit L2 are electrically coupled to a second terminal of the capacitance unit C1.

Alternatively stated, in some embodiments, the inductance units L1, L2, and the capacitance unit C1 may be arranged correspondingly according to the actual requirements of the circuit in order to perform rectification and filtering to the secondary voltage Vs in accompanied with the switching circuit 140 to provide the output voltage Vo. Therefore, the circuitry shown in the various embodiments mentioned above are merely examples and not meant to limit the present disclosure.

Figure 9:
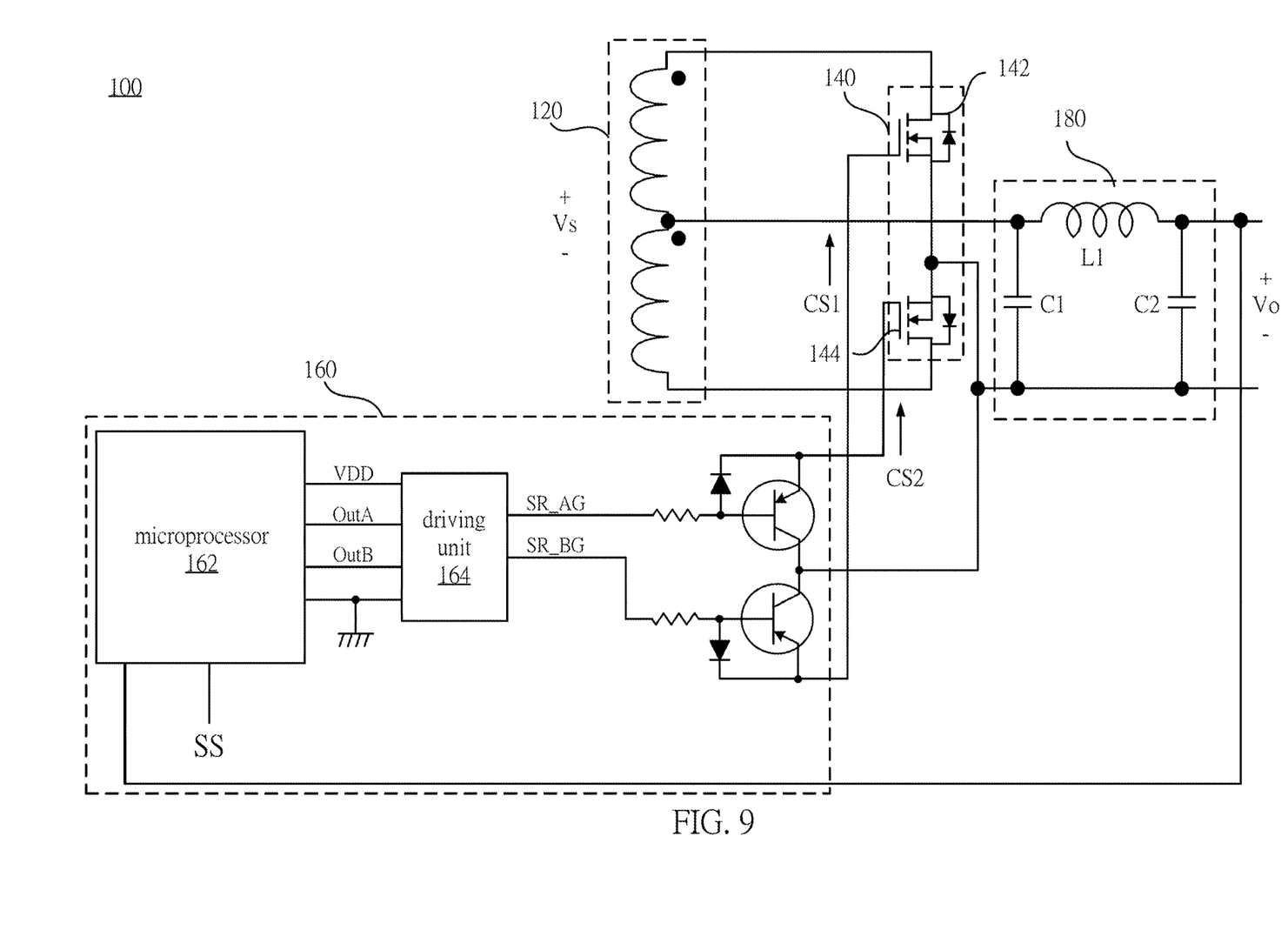
FIG. 9 is a diagram illustrating a controller according to some embodiments of the present disclosure.

Reference is made to FIG. 9. FIG. 9 is a diagram illustrating the controller 160 according to some embodiments of the present disclosure. As shown in FIG. 9, in some embodiments, the controller 160 includes 1 microprocessor 162 and a driving unit 164. The microprocessor 162 may receive a system signal SS from the system terminal to selectively control the power supply 100 to be operated under the operating mode or the standby mode. The driving unit 164 is electrically coupled to the microprocessor 162 and configured to receive the reference voltage VDD and signals OutA, OutB from the microprocessor 162, and output driving signals SR_AG, SR_BG according to the signals OutA, OutB, so as to output the control signals CS1, CS2 to the switching units 142, 144 in accompanied with the driving circuit formed by the resistors, diodes, transistors in the controller 160.

In addition, in some embodiments, the microprocessor 162 may also detect the magnitude of the output voltage Vo by a feedback loop. Thus, on the condition that the power supply is operated under a standby mode, the controller 160 may selectively output control signals CS1, CS2 respectively to control on and off of the switching units 142, 144 according to the output voltage Vo.

Figure 10A:
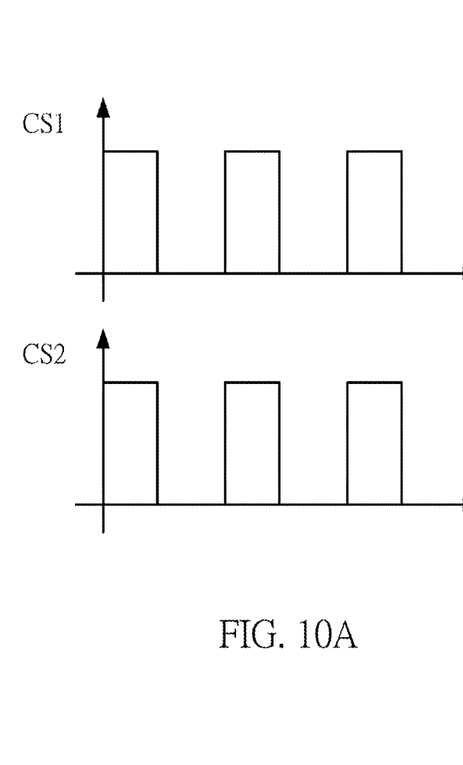
FIGS. 10A-10C are diagrams illustrating the waveform of control signals according to some embodiments of the present disclosure.
Figure 10B:
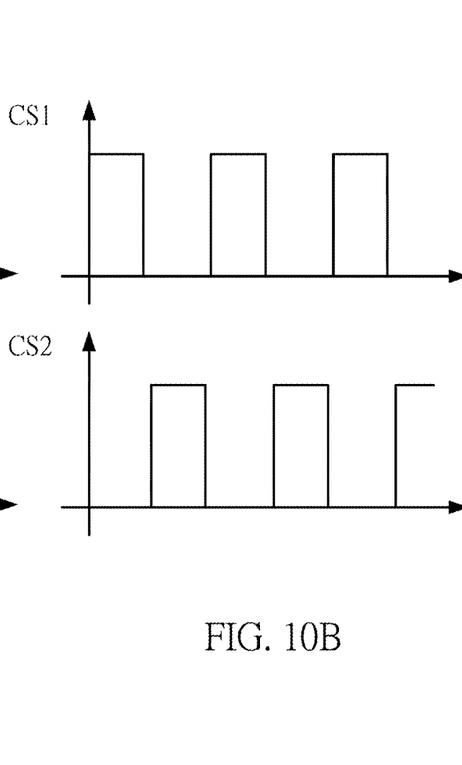
Figure 10C:
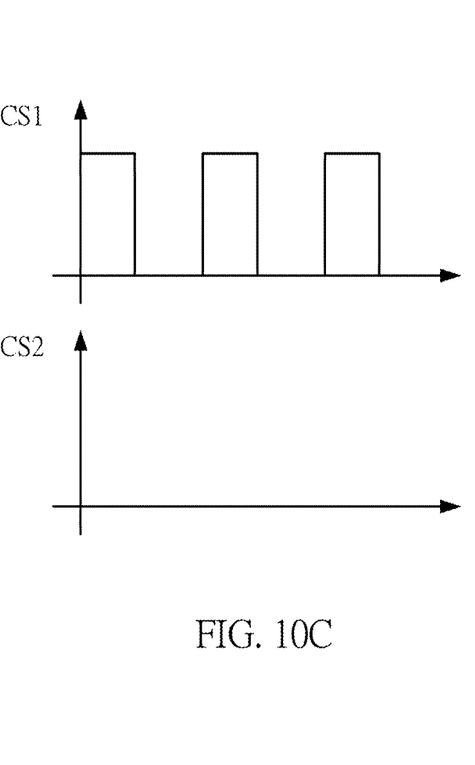

Reference is made to FIG. 10A to FIG. 10C. FIG. 10A to FIG. 10C are wave diagrams illustrating the control signals CS1, CS2 according to some embodiments of the present disclosure. For better understand of the present disclosure, the control signals CS1, CS2 shown in FIG. 10A to FIG. 10C are discussed in accompanied with the embodiments shown in FIG. 9 but not limited thereto. It will be apparent to those skilled in the art that various modifications and variations can be made without departing from the scope or spirit of the disclosure.

As shown in FIG. 10A to FIG. 10C, the controller 160 may output pulse width modulation signals as the control signals CS1, CS2, and control the conduction time of the discharging path by adjusting the duty cycle of the control signals CS1, CS2.

For example, in some embodiments, on the condition that the output voltage Vo is higher than the configuration level, the controller 160 may be configured to output the control signal CS1 and the control signal CS2 to turn on the switching unit 142 and the switching unit 144 at the same time in the complete cycle, such that the discharging path is continuous conducting during the whole cycle, and the residual voltage may be reduced rapidly.

On the other hand, on the condition that the output voltage Vo is lower than the configuration level, the controller 160 may be configured to output pulse width modulation signals as the control signals CS1, CS2, such that the discharging path is conducting during a partial period in the whole cycle to discharge.

In addition, on the condition that the output voltage Vo is high, the controller 160 may increase the duty cycle of the control signals CS1, CS2 by feedback control. On the other hand, on the condition that the output voltage is low, the controller 160 may reduce the duty cycle of the control signals CS1, CS2 by feedback control. Accordingly, by the control stated above, the overall power loss of the power supply 100 may be reduced while the criteria of the residual voltage at the output terminal is satisfied.

As shown in FIG. 10B, in some embodiments, the control signals CS1, CS2 may be at an enable level during the first half cycle and the second half cycle respectively. Specifically, on the condition that the control signal CS1 is configured to turn on the transistor switch in the switching unit 142, the body diode in the switching unit 144 may provide the current path. Accordingly, even if the control signal CS2 is at a disable level, the switching unit 142 and the switching unit 144 may still form a discharging path to discharge. Similarly, on the condition that the control signal CS2 is configured to turn on the transistor switch in the switching unit 144, the body diode in the switching unit 142 may provide the current path in order to provide the discharging path on the condition that the control signal CS1 is at the disable level.

In addition, in some embodiments, according to the output voltage Vo, the controller 160 may also choose to control on and off of both switching units 142, 144 at the same time, or control on and off of only one of the switching units 142, 144.

For example, in some embodiments, on the condition that the output voltage Vo is higher than a configuration level, the controller 160 may be configured to control on and off of the switching unit 142 and the switching unit 144 at the same time to speed up the discharge of the residual voltage. On the other hand, on the condition that the output voltage Vo is lower than the configuration level, the controller 160 is configured to output the pulse width modulation signal depicted in FIG. 10C, which only outputs one set control signal CS1 to control the switching unit 142 so as to reduce the switching loss for controlling the switching units 142, 144.

It is noted that the controller 160 may also only output one set control signal CS2 to control the switching unit 144. Alternatively stated, the controller 160 may output only one set control signal CS1 or control signal CS2 to control on and off of only one of the switching unit 142 and the switching unit 144.

Therefore, by the control method mentioned above, the controller 160 may reduce the overall power loss of the power supply 100 while the criteria of the residual voltage at the output terminal is satisfied, such that the loss during the power supply 100 operated under the standby mode is reduced, and therefore an energy-saving and low power consumption power supply 100 is guaranteed.

Figure 11:
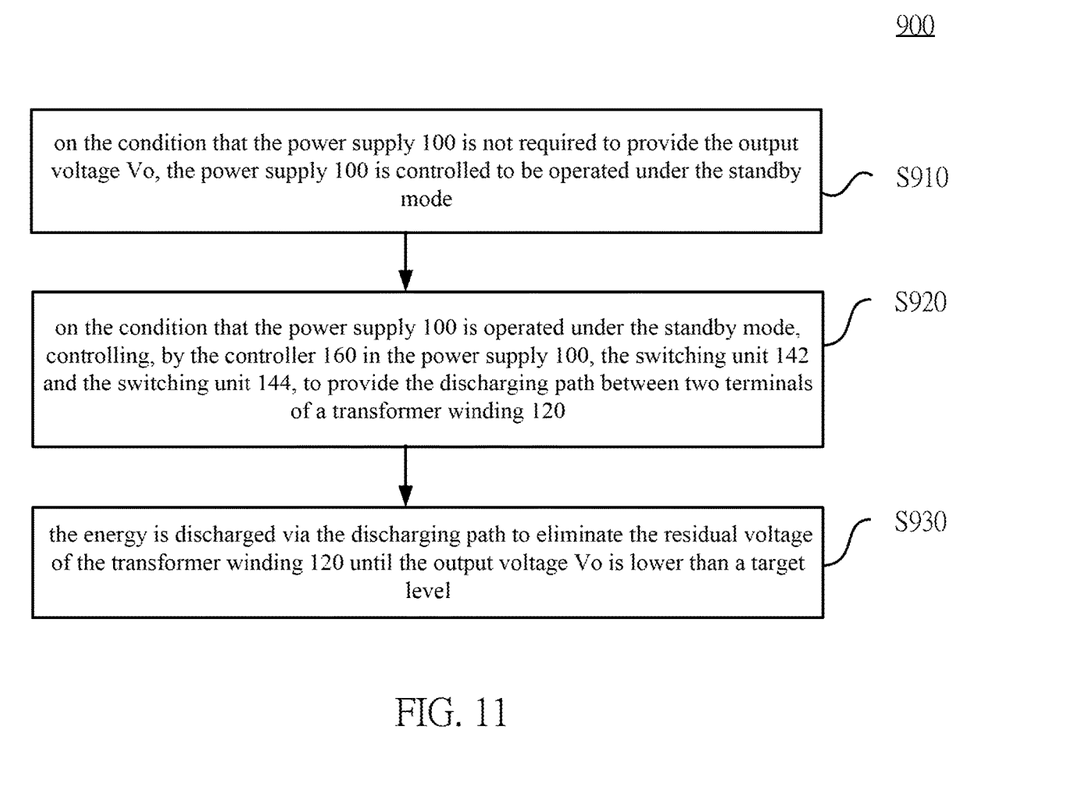
FIG. 11 is a flowchart illustrating a residual voltage discharging method according to some embodiments of the present disclosure.

Reference is made to FIG. 11. FIG. 11 is a flowchart illustrating a residual voltage discharging method 900 according to some embodiments of the present disclosure. For better understanding of the present disclosure, the following residual voltage discharging method 900 is discussed in accompanied with the embodiments of FIG. 1-FIG. 10 but not limited thereto. For those skilled in the art, various modifications and variations can be made without departing from the scope or spirit of the disclosure. As shown in FIG. 11, the residual voltage discharging method 900 includes steps S910, S920 and S930.

First, in the step S910, on the condition that the power supply 100 is not required to provide the output voltage Vo, the power supply 100 is controlled to be operated under the standby mode.

Next, in the step S920, on the condition that the power supply 100 is operated under the standby mode, controlling, by the controller 160 in the power supply 100, the switching unit 142 and the switching unit 144, to provide the discharging path between two terminals of a transformer winding 120.

Specifically, as stated in the above embodiments, the switching units 142, 144 are configured to be on or off selectively on the condition that the power supply 100 is operated under the operating mode to provide the output voltage Vo.

Next, in the step S930, the energy is discharged via the discharging path to eliminate the residual voltage of the transformer winding 120 until the output voltage Vo is lower than a target level. Thus, the criteria of the residual voltage at the output terminal may be satisfied.

In addition, in some embodiments, the residual voltage discharging method 900 further includes detecting a voltage level of the output voltage Vo, and adjusting the control signals CS1, CS2 according to the output voltage Vo.

In some embodiments, on the condition that the output voltage Vo is higher than the configuration level, the controller 160 outputs the control signals CS1, CS2 to turn on the switching unit 142 and the switching unit 144 at the same time. On the condition that the output voltage Vo is lower than the configuration level, the controller 160 outputs pulse width modulation signals as the control signals CS1, CS2.

Specifically, on the condition that the output voltage Vo is lower than the configuration level, the controller 160 may adjust the duty cycles of the control signals CS1, CS2 according to the voltage level of the output voltage Vo, to control the switching unit 142 and the switching unit 144 to be on or off.

In addition, in some other embodiments, on the condition that the output voltage Vo is higher than the configuration level, the controller 160 controls on and off of the switching unit 142 and the switching unit 144 at the same time. On the condition that the output voltage Vo is lower than the configuration level, the controller 160 controls on and off of one of the switching unit 142 and the switching unit 144, and the discharging path is provided by the body diode in the switching unit 142 and the switching unit 144.

Those skilled in the art can immediately understand how to perform the operations and functions of the residual voltage discharging method 900 based on the power supply 100 in the embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, in various embodiments of the present disclosure, the residual voltage in the power supply may be eliminated by arranging the semiconductor elements in the secondary circuit of the power supply on the condition that no power output for the power supply. In addition, by the control method of the present disclosure, the semiconductor elements which are idle during the standby mode may be control correspondingly by the controller, so as to achieve the effect of eliminating residual voltage without introducing extra elements.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply configured to provide an output voltage to a load, comprising:
    a transformer winding, configured to provide a first voltage;
    a switching circuit, electrically coupled to the transformer winding, wherein the switching circuit comprises a first switching unit and a second switching unit;
    a controller electrically coupled to the first switching unit and the second switching unit, wherein on the condition that the power supply is operated under a standby mode, the controller is configured to control the first switching unit and the second switching unit to short-circuit two terminals of the transformer winding to form a discharging path between the two terminals of the transformer winding, wherein residual voltage of the transformer winding is eliminated via the discharging path such that the output voltage is reduced to be lower than a target level, wherein on the condition that the power supply is operated under an operating mode, the controller is configured to control the switching circuit to provide a second voltage according to the first voltage; and
    a filter circuit, electrically coupled to the switching circuit and configured to filter the second voltage to provide the output voltage;
    wherein the standby mode comprises a condition that the power supply is not required to provide the output voltage to the load.

2. The power supply of claim 1, wherein on the condition that the power supply is operated under the operating mode, the controller is configured to control the first switching unit and the second switching unit to be on respectively in a first period and a second period.

3. The power supply of claim 1, wherein the first switching unit is electrically coupled between a first terminal of the transformer winding and a first input terminal of the filter circuit, the second switching unit is electrically coupled between a second terminal of the transformer winding and the first input terminal of the filter circuit, and a center tap terminal of the transformer winding is electrically coupled to a second input terminal of the filter circuit.

4. The power supply of claim 1, wherein the first switching unit is electrically coupled between a first terminal of the transformer winding and a first input terminal of the filter circuit, the second switching unit is electrically coupled between the first input terminal of the filter circuit and a second input terminal of the filter circuit, and a second terminal of the transformer winding is electrically coupled to the second input terminal of the filter circuit.

5. The power supply of claim 1, wherein a first terminal of the first switching unit is electrically coupled to a first terminal of the transformer winding, a second terminal of the first switching unit is electrically coupled to a first terminal of the second switching unit, and a second terminal of the second switching unit is electrically coupled to a second terminal of the transformer winding.

6. The power supply of claim 5, wherein the first terminal of the transformer winding is electrically coupled to a first input terminal of the filter circuit and the second terminal of the transformer winding is electrically coupled to a second input terminal of the filter circuit.

7. The power supply of claim 1, wherein the filter circuit comprises a first inductance unit and a second inductance unit, and a first terminal of the first inductance unit is electrically coupled to a first terminal of the transformer winding, a second terminal of the first inductance unit is electrically coupled to a first terminal of the second inductance unit, and a second terminal of the second inductance unit is electrically coupled to a second terminal of the transformer winding.

8. The power supply of claim 7, wherein the filter circuit further comprises a capacitance unit, and the first switching unit is electrically coupled between the first terminal of the transformer winding and a first terminal of the capacitance unit, the second switching unit is electrically coupled between the second terminal of the transformer winding and the first terminal of the capacitance unit, and the second terminal of the first inductance unit is electrically coupled to a second terminal of the capacitance unit.

9. The power supply of claim 1, wherein each of the first switching unit and the second switching unit includes a transistor switch and a body diode, and the body diodes in the first switching unit and the second switching unit are reversely coupled to each other.

10. The power supply of claim 1, wherein on the condition that the power supply is operated under the standby mode, the controller is configured to selectively output a first control signal and a second control signal according to the output voltage, wherein the first control signal and the second control signal are configured to control on and off of the first switching unit and the second switching unit, respectively.

11. The power supply of claim 10, wherein on the condition that the output voltage is higher than a configuration level, the controller is configured to output the first control signal and the second control signal to turn on the first switching unit and the second switching unit at the same time.

12. The power supply of claim 10, wherein on the condition that the output voltage is lower than a configuration level, the controller is configured to output pulse width modulation signals as the first control signal and the second control signal.

13. The power supply of claim 10, wherein on the condition that the output voltage is higher than a configuration level, the controller is configured to control on and off of the first switching unit and the second switching unit at the same time.

14. The power supply of claim 10, wherein on the condition that the output voltage is lower than a configuration level, the controller is configured to control on and off of only one of the first switching unit and the second switching unit.

15. A residual voltage discharging method for a power supply, wherein the power supply is configured to provide an output voltage to a load, wherein the residual voltage discharging method comprises:

controlling, by a controller in the power supply, the power supply to be operated under a standby mode or an operating mode;

on the condition that the power supply is operated under the standby mode, the method further comprising:

controlling a first switching unit and a second switching unit, which are electrically coupled to a transformer winding, to short-circuit two terminals of the transformer winding in the power supply to form a discharging path between the two terminals of the transformer winding; and eliminating residual voltage of the transformer winding via the discharging path such that the output voltage is reduced to be lower than a target level;

wherein the standby mode comprises a condition that the power supply is not required to provide the output voltage to the load;

on the condition that the power supply is operated under operating mode, controlling, by the controller, the first switching unit and the second switching unit to provide the output voltage.

16. The residual voltage discharging method of claim 15, further comprising:

detecting a voltage level of the output voltage;

on the condition that the output voltage is higher than a configuration level, outputting a first control signal and a second control signal, by the controller, to turn on the first switching unit and the second switching unit at the same time; and on the condition that the output voltage is lower than the configuration level, outputting pulse width modulation signals as the first control signal and the second control signal, by the controller, to control the first switching unit and the second switching unit to be on or off.

17. The residual voltage discharging method of claim 16, further comprising:

on the condition that the output voltage is lower than the configuration level, adjusting duty cycles of the first control signal and the second control signal according to the voltage level of the output voltage to control the first switching unit and the second switching unit to be on or off.

18. The residual voltage discharging method of claim 15, further comprising:

detecting a voltage level of the output voltage;

on the condition that the output voltage is higher than a configuration level, controlling on and off of the first switching unit and the second switching unit, by the controller, at the same time; and on the condition that the output voltage is lower than the configuration level, controlling on and off of one of the first switching unit and the second switching unit, by the controller, and providing the discharging path by a body diode in the first switching unit and the second switching unit.

* * * * *